Oct. 4, 1932.  F. C. F. EVENNETT  1,880,948

VALVE

Filed Jan. 10, 1931

Frederick C. F. Evennett
By Hubert Peck
Attorney

Patented Oct. 4, 1932

1,880,948

UNITED STATES PATENT OFFICE

FREDERICK CHARLES FELIX EVENNETT, OF LEE, ENGLAND

VALVE

Application filed January 10, 1931, Serial No. 507,988, and in Great Britain January 11, 1930.

The present invention is concerned with improvements in or relating to fluid control devices, such as taps, cocks, valves and the like (hereinafter referred to as cocks), which are used to vary or stop the flow of fluids (for example, liquids, pulverized fuel, flour or the like) in pipes, tubes, channels or the like (hereinafter referred to as pipes) and which are of the type comprising a valve seating, a valve member, and actuating means for the latter, all of which are wholly enclosed in a conduit, operation of the valve member being effected by distortion of a part of the said conduit; the invention will be described illustratively in connection with various constructions embodying features of the invention, but it is to be understood that these are by way of example only since a construction selected in any particular case should obviously be such as to suit the particular conditions of use.

In the case of some medical and photographic apparatus it is important that the flow of a liquid should be readily variable both quickly and as to quantity; it is also in some cases important that there should be no chance of leakage of the fluid to the exterior of the apparatus.

It is one object of the invention to provide a novel fluid control device of the type hereinbefore specified which can be readily handled and controlled by one hand and which shall be readily and speedily operable to vary or stop the flow of the fluid being controlled, and by means of which such variations may be effected by small amounts.

Another object of the invention is to provide a simple construction in which the number of parts shall be reduced to a minimum, and one which if connected to a flexible conduit as is contemplated, may be thrown upon the ground or over a narrow support with assurance that the valve will not be caused to operate to permit the discharge of the fluid.

A feature of the invention is a fluid control device of the type specified in which all the parts that control the fluid are embraced along their whole length by a rigid shroud and in which the said parts are operable by mere distortion of an enclosing medium which is adapted under pressure to press directly on the valve member.

Another feature of the invention is a saleable article for use as part of a fluid control device, comprising a rigid casing which has a passage therethrough for the transfer of the material it is desired to control by the device, a fluid discharge nozzle rigid with the said rigid casing, a valve seat, and a valve member to co-operate with the seat to close the said passage and embraced along its whole length by the said casing, the construction and arrangement being such that pressure exerted upon a distortable member associated in the fluid control device with the rigid casing may cause the distortable member to press directly against the valve member to move the valve member relatively to its seating, for example, to open the said passage.

The various objects and the several features of the invention will become apparent to those skilled in the art from the following description, in conjunction with the accompanying diagrammatic drawing, of the aforementioned illustrative constructions.

Figure 1:
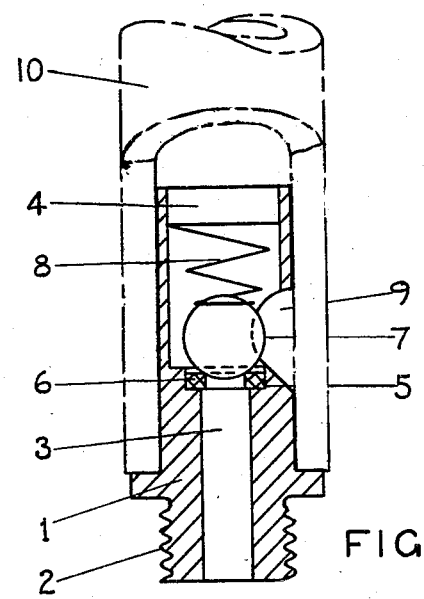
Fig. 1 is a vertical longitudinal section through a complete valve casing disclosing the valve assembly of the invention.

In the embodiment shown I provide a casing 1 (Fig. 1) formed of a vulcanite material which is provided at its discharge end with screw threads 2 for the ready reception of a discharge nozzle thereon. The casing 1 is bored throughout its length as at 3 and 4 for the passage therethrough of a fluid, the boring 4 being of greater diameter than the boring 3 for a purpose to be hereinafter pointed out. Formed at the base of bore 4 adjacent the smaller bore 3 is a recess 5 into which is placed a circular rubber valve seat member 6 which forms a seat for a ball valve 7. To provide against accidental displacement of valve 7 from its seat 6, a coiled spring member 8 is secured to the walls of bore 4 and is also secured to ball valve 7 thereby exerting a downward pressure on said valve and tending to keep the channel closed. The casing 1 adjacent the valve 7 is recessed as at 9 thereby providing an aperture between the interior and exterior of the casing. The end of an elastic rubber tube or pipe 10 running from the source of the fluid supply is fitted over the casing 1, being brought over said casing to a point adjacent and just above the threaded portion 2. It is apparent that the rubber tube or pipe 10 covers the recess 9 in casing 1 and it is from this section of the device that the operator thereof is able with great ease to regulate the flow of the fluid from bore 4 to bore 3 and from there into the discharge nozzle (not shown) which would be screwed on the casing 1 at 2.

In use the of valve is normally on its seating as indicated in Fig. 1. When it is desired to open the valve the operator will press the part of the rubber pipe adjacent to the recess 9 into the recess and the inner wall of the tube will contact with and move the valve laterally to open the passage; the ball valve in being moved laterally will also be somewhat raised.

From the above description of the operation of the invention it may be clearly understood that it may conveniently and easily be efficiently operated with the use of only one hand of the operator thereby allowing him to manage with the other hand the receptacle into which the liquid may be flowing from the discharge nozzle.

Figure 2:
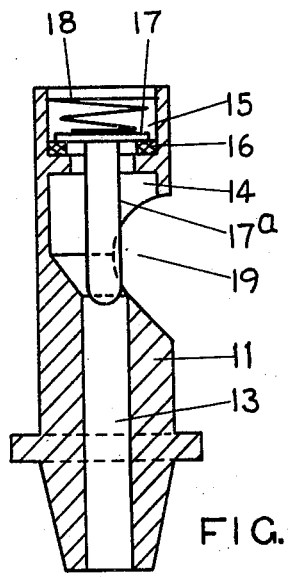
Fig. 2 is a vertical longitudinal section similar to Fig. 1 disclosing a modified form of valve assembly.
Figure 3:
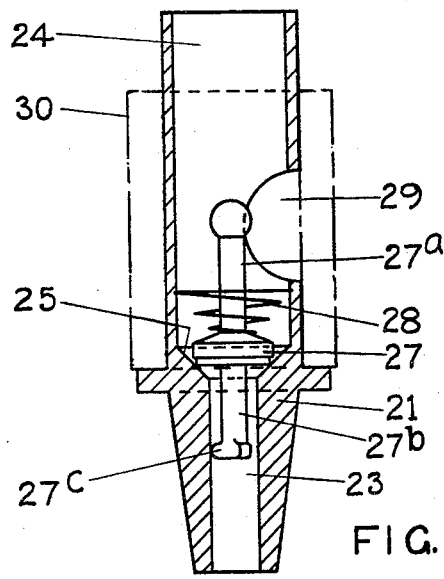
Fig. 3 is a vertical longitudinal section similar to Fig. 1 and Fig. 2 disclosing another modified form of valve assembly.
Figure 4:
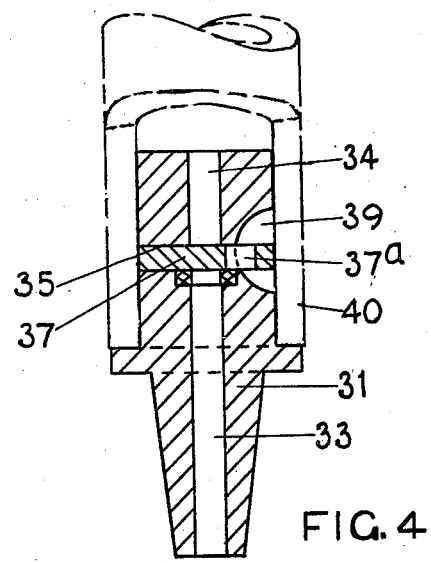
Fig. 4 is a vertical longitudinal section similar to Fig. 1, Fig. 2 and Fig. 3 disclosing a further modified form of valve assembly.

As I am desirous of disclosing several modifications of my invention I have done so in Figs. 2, 3 and 4 of the drawing.

Similarly various other forms and arrangements of my invention can be resorted to and the invention is in no sense limited in its broad aspects to the forms here shown.

Referring to Fig. 2 the modification shown therein comprises a casing 11 (formed at its lower part as a discharge nozzle), bored at 13 and 14, and recessed at 15, and provided with a rubber valve seating 16. A mushroom valve 17 is held on the seat by a spring 18. The valve is provided with a depending shank 17a, the lower part of which is opposite a recess 19 cut in the wall of the casing. In the case of this construction also it is contemplated that the upper part of the casing shall be inserted into the end of a piece of elastic tubing. Pressure on the tubing will be transferred to the shank 17a which will be moved laterally and will cant the valve 17 on its seating and so open the passage for the fluid.

Referring to Fig. 3 this modification comprises a casing 21 (formed at its lower part as a nozzle), bored at 23 and 24 and recessed at 25 to provide a conical valve seating. A valve 27 is held on the seating by a spring 28 and is provided with a shank 27a, the upper part of which is opposite a recess 29 in the wall of the casing. The valve has also a depending shank 27b provided with a three-armed spider 27c adapted to locate the shank more or less centrally in the passage 23. In this case the casing is surrounded by a short piece of elastic tubing 30, and is arranged, as by internal screwing at its upper end, to be fitted to the end of a metal pipe (not shown). Pressure on the tubing will be transferred to the shank 27a which will be moved laterally to cant the valve 27 somewhat, also the valve will be raised upwardly by the conical seating 25 which will act as a cam.

Referring now to Fig. 4 wherein is disclosed a further modification comprising a casing 31 formed at its lower part as a nozzle, bored at 33 and 34, and recessed at 35 for the reception of a plate valve 37 that has an off-set orifice 37a. Part of the valve 37 projects into a recess 39 cut in the wall of the casing. The upper part of the casing is inserted into the end of a piece of elastic tubing 40. Pressure on the tubing will move the valve laterally to permit the orifice 37a to register more or less with the passages 33, 34. On release of the pressure the elasticity of the tubing will cause return of the valve to its normal closed position.

It will be observed that in each example of my invention the valve members are embraced along their whole length (that is, in the direction of the flow of the fluid) by a rigid shroud and that movement of the valve to open the fluid passage may be effected by the simple act of varying pressure upon the exterior of a distortable member or portion of the wall of the fluid passage adjacent to the valve member to press it directly against the valve member, which distortable member or portion in the particular examples is an elastic diaphragm; also on release if the pressure the valve will be returned (in each of the various examples) automatically to close the fluid passage.

By constructing the device with the fluid discharge nozzle rigid with the valve-embracing shroud the device can be controlled and the flow of the fluid directed by one and the same hand.

Although springs have been referred to as holding the valves on their seats, such springs may not be necessary as the normal pressure of the fluid may be sufficient.

Although the illustrative valves have been described as being normally closed, they might be arranged to be normally open to give a predetermined rate of flow; it might be then arranged that pressure on the diaphragm would open them further or that such pressure would close them.

What I claim is:—

1. A fluid control device, comprising a casing having a passage therethrough, a distortable enclosing medium for said casing, a valve member mounted in said casing, a valve seat, spring means normally forcing said valve member to seated position, said casing formed with an aperture therethrough removed from said spring means and adjacent said valve member, said valve member in normal seated position out of contact with said enclosing medium, and said valve member displaceable laterally from said valve seat by distortion of said enclosing medium inwardly through the aperture in said casing to directly engage and unseat said valve member.

2. A fluid control device, comprising a casing have a passage therethrough, a distortable enclosing medium for said casing, a ball valve mounted in said casing, a valve seat, spring means normally forcing said valve member to seated position, said casing formed with an aperture therethrough removed from said spring means and adjacent said ball valve, said ball valve in normal seated position out of contact with said enclosing medium, and said ball valve bodily movable laterally of said casing to unseated position by distortion of said enclosing medium inwardly through the aperture into direct displacing engagement with said ball valve.

3. A fluid control device, comprising a casing having a passage therethrough, a distortable enclosing medium for said casing, a valve member mounted in said casing, a valve seat, spring means normally forcing said valve member to seated position, said valve member including a rigid forwardly projecting shank, said casing formed with an aperture therethrough removed from said spring means and adjacent said shank, said valve member in normal seated position out of contact with said enclosing medium, and said valve displaceable laterally from the valve seat by distortion of said enclosing medium inwardly through said aperture in the casing into contact with said shank.

4. A fluid control device, comprising a casing having a passage therethrough, a distortable enclosing medium for said casing, a valve member mounted in said casing, a valve seat, spring means normally forcing said valve member to seated position, said casing formed with an aperture therethrough removed from said spring means and adjacent said valve member, said valve member in normal seated position out of contact with the enclosing medium, and the valve member including a rearwardly projecting rigid shank, said valve displaceable laterally from the seat by distortion of said enclosing medium through said aperture into contact with said shank and said valve member including means whereby said member is returned to seated position on said valve seat.

5. A fluid control device, comprising a casing having a passage therethrough, a distortable enclosing medium for said casing, a valve member mounted in said casing, a valve seat, spring means normally forcing said valve member to seated position, said casing formed with an aperture therethrough removed from said spring means and adjacent said valve member, said valve member in normal seated position out of contact with said enclosing medium, and the valve member including a rearwardly projecting rigid shank and a forwardly projecting rigid shank, said valve member displaceable laterally from the seat by distortion of the enclosing medium through said aperture to engage said rearwardly projecting shank and said valve member positioned for seating by said forwardly projecting shank.

6. A fluid control device, comprising a casing having a passage therethrough, a distortable enclosing medium for said casing, a valve member mounted in said casing, a valve seat, spring means normally forcing said valve member to seated position, said casing formed with an aperture therethrough removed from said spring means and adjacent the valve member, said valve member in normal seated position out of contact with said enclosing medium, forwardly and rearwardly projecting shanks rigid with the valve, said valve laterally displaceable from said valve seat by application of pressure on said rearwardly projecting shank, and means on said forwardly projecting shank whereby said valve is positioned for seating upon the release of pressure from said rearwardly projecting shank.

Dated this 30th day of December, 1930.

FREDERICK CHARLES FELIX EVENNETT.